(12) United States Patent
Isono et al.

(10) Patent No.: US 12,078,002 B2
(45) Date of Patent: Sep. 3, 2024

(54) SLIDING DOOR DRIVE DEVICE

(71) Applicant: AISIN CORPORATION, Kariya (JP)

(72) Inventors: Taishi Isono, Kariya (JP); Shinji Kazama, Kariya (JP); Akinori Suzuki, Kariya (JP)

(73) Assignee: AISIN CORPORATION, Kariya (JP)

( * ) Notice: Subject to any disclaimer, the term of this patent is extended or adjusted under 35 U.S.C. 154(b) by 332 days.

(21) Appl. No.: 17/591,763

(22) Filed: Feb. 3, 2022

(65) Prior Publication Data

US 2022/0282548 A1 Sep. 8, 2022

(30) Foreign Application Priority Data

Mar. 2, 2021 (JP) ................................ 2021-032564
Sep. 3, 2021 (JP) ................................ 2021-144031

(51) Int. Cl.
*E05F 15/643* (2015.01)
*B60J 5/06* (2006.01)
*E05D 15/06* (2006.01)
*E05F 15/655* (2015.01)

(52) U.S. Cl.
CPC ............... *E05F 15/643* (2015.01); *B60J 5/06* (2013.01); *E05D 15/06* (2013.01); *E05F 15/655* (2015.01)

(58) Field of Classification Search
CPC ..... E05F 15/643; E05F 15/655; E05F 15/646; B60J 5/06; E05D 15/06; E05Y 2201/652; E05Y 2201/66; E05Y 2201/684; E05Y 2800/266; E05Y 2900/531

USPC ......................................................... 296/155
See application file for complete search history.

(56) References Cited

U.S. PATENT DOCUMENTS

| 5,168,666 | A  | * | 12/1992 | Koura ................... E05F 15/646 49/360 |
| 7,585,014 | B2 | * | 9/2009  | Nishimura ................. B60J 5/06 49/262 |
| 9,033,397 | B2 | * | 5/2015  | Sumiya ...................... B60J 5/06 296/155 |
| 2004/0172884 | A1 | * | 9/2004 | Engelgau .............. E05F 15/638 49/360 |
| 2014/0046551 | A1 | * | 2/2014 | Ojima ..................... B60J 5/047 701/49 |

FOREIGN PATENT DOCUMENTS

JP 2019-100081 A 6/2019

* cited by examiner

*Primary Examiner* — Pinel E Romain
(74) *Attorney, Agent, or Firm* — Oblon, McClelland, Maier & Neustadt, L.L.P.

(57) ABSTRACT

Provided is a sliding door drive device enabling suppression of bulging against a body panel being a fixing target. The sliding door drive device includes a long guide frame, a first driven pulley and a second driven pulley being supported at both ends of the guide frame in a longitudinal direction, respectively, a belt being wrapped around the first driven pulley and the second driven pulley, and a belt drive part driving the belt. The guide frame includes a guide wall guiding the belt between the first driven pulley and the second driven pulley. The sliding door drive device further includes a sliding plate being placed at a position sandwiching the belt with an inner side of a curved part of the guide wall, and sliding on the driven belt.

8 Claims, 10 Drawing Sheets

SLIDING DOOR DRIVE DEVICE

CROSS REFERENCE TO RELATED APPLICATIONS

This application is based on and claims priority under 35 U.S.C. § 119 to Japanese Patent Application 2021-144031, filed on Sep. 3, 2021 and Japanese Patent Application 2021-032564, filed on Mar. 2, 2021, the entire content of which is incorporated herein by reference.

TECHNICAL FIELD

This disclosure generally relates to a sliding door drive device.

BACKGROUND DISCUSSION

A door opening-closing device is described in JP2019-100081A (Reference 1) as a sliding door drive device opening and closing a sliding door of a vehicle. The door opening-closing device includes a belt guide part extending along a guide rail, two timing pulleys provided at the front end and the rear end of the belt guide part, respectively, a belt wrapped around the two timing pulleys, and a pressing pulley pressing the belt down toward the belt guide part.

The guide rail includes a linear part extending in a lengthwise direction and a curved part curved from the front end of the linear part toward a cabin. Therefore, the belt guide part also includes a linear part associated to the linear part of the guide rail and a curved part associated to the curved part of the guide rail. The pressing pulley is provided in the curved part of the belt guide part. Specifically, the pressing pulley prevents the belt from being driven in a state of being apart from the curved part of the belt guide part.

When a door opening-closing device as described above is fixed to a body panel of a vehicle, the pressing pulley is positioned between the belt guide part and the body panel. Therefore, a vehicle as described above needs to be provided with a recessed part on the body panel for avoiding interference by the pressing pulley.

A need thus exists for a sliding door drive device which is not susceptible to the drawback mentioned above.

SUMMARY

A sliding door drive device that solves the aforementioned problem is a sliding door drive device being fixed to a body panel of a vehicle and moving a sliding door of the vehicle in an opening direction and a closing direction. The sliding door drive device includes a long guide frame, a first driven pulley, a second driven pulley, a belt, a belt drive part, and a sliding part. The guide frame is curved in such a way that an end of the guide frame in the closing direction is positioned more inward in a vehicle widthwise direction than an end in the opening direction when the guide frame is fixed to the body panel. The first driven pulley and the second driven pulley are supported at both ends of the guide frame in a longitudinal direction, respectively. The belt is wrapped around the first driven pulley and the second driven pulley. The belt drive part drives the belt. The guide frame includes a guide wall guiding the belt between the first driven pulley and the second driven pulley. Denoting a curved part of the guide wall by a curved part and a surface of the guide wall facing the body panel by an inner side, the sliding part is placed at a position sandwiching the belt with the inner side of the curved part of the guide wall and slides on the driven belt.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of a vehicle including a sliding door drive device (hereinafter also referred to as a "door drive device") will be described below.

Vehicle 10

Figure 1:
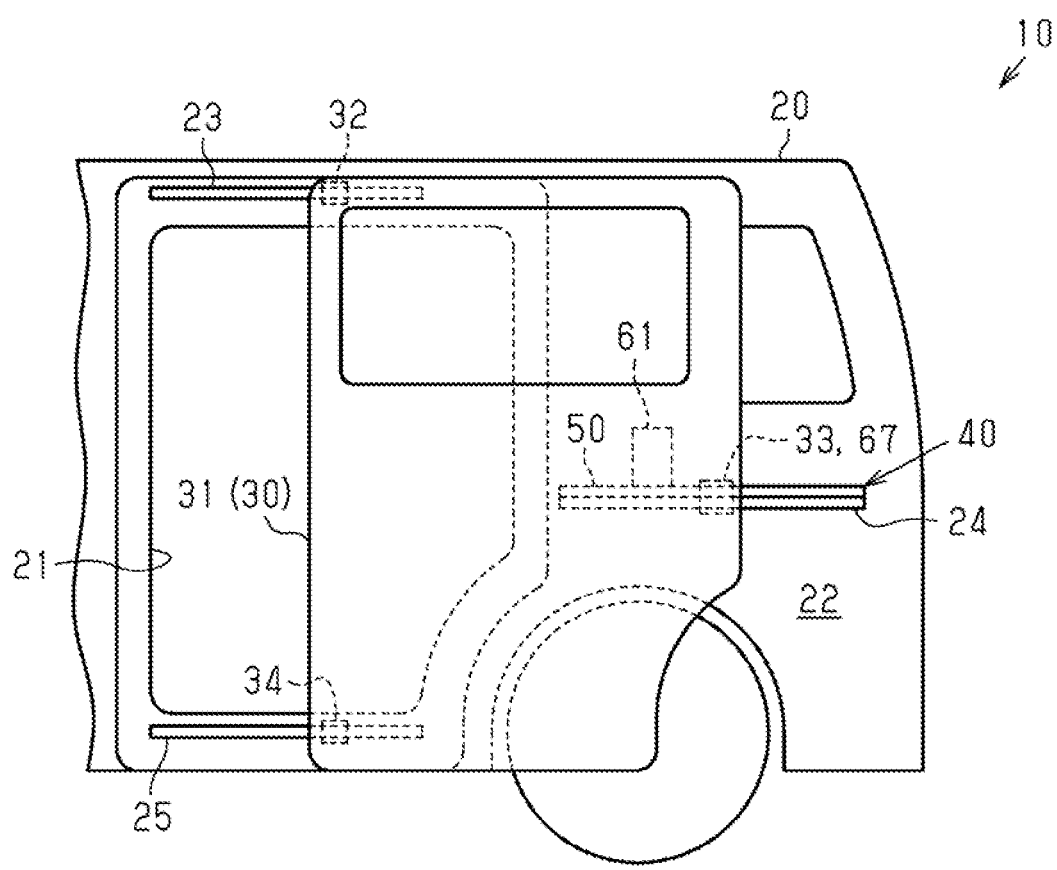
FIG. 1 is a schematic diagram of a vehicle including a sliding door drive device according to an embodiment disclosed here.

As illustrated in FIG. 1, a vehicle 10 includes a vehicle body 20, a sliding door 30, and a door drive device 40. In the following description, a vehicle widthwise direction is also referred to as a "widthwise direction," and a vehicle lengthwise direction is also referred to as a "lengthwise direction," and a vehicle vertical direction is also referred to as a "vertical direction."

Vehicle Body 20

The vehicle body 20 includes a body panel 22 on which a door opening 21 is provided, an upper rail 23 placed above the door opening 21, a center rail 24 placed behind the door opening 21, and a lower rail 25 placed below the door opening 21. The upper rail 23, the center rail 24, and the lower rail 25 are fixed to the body panel 22. In the vertical direction, the upper rail 23 is positioned above the center rail 24 and the lower rail 25, and the center rail 24 is positioned between the upper rail 23 and the lower rail 25. The upper rail 23, the center rail 24, and the lower rail 25 are members for defining an opening-closing direction of the sliding door 30.

Figure 2:
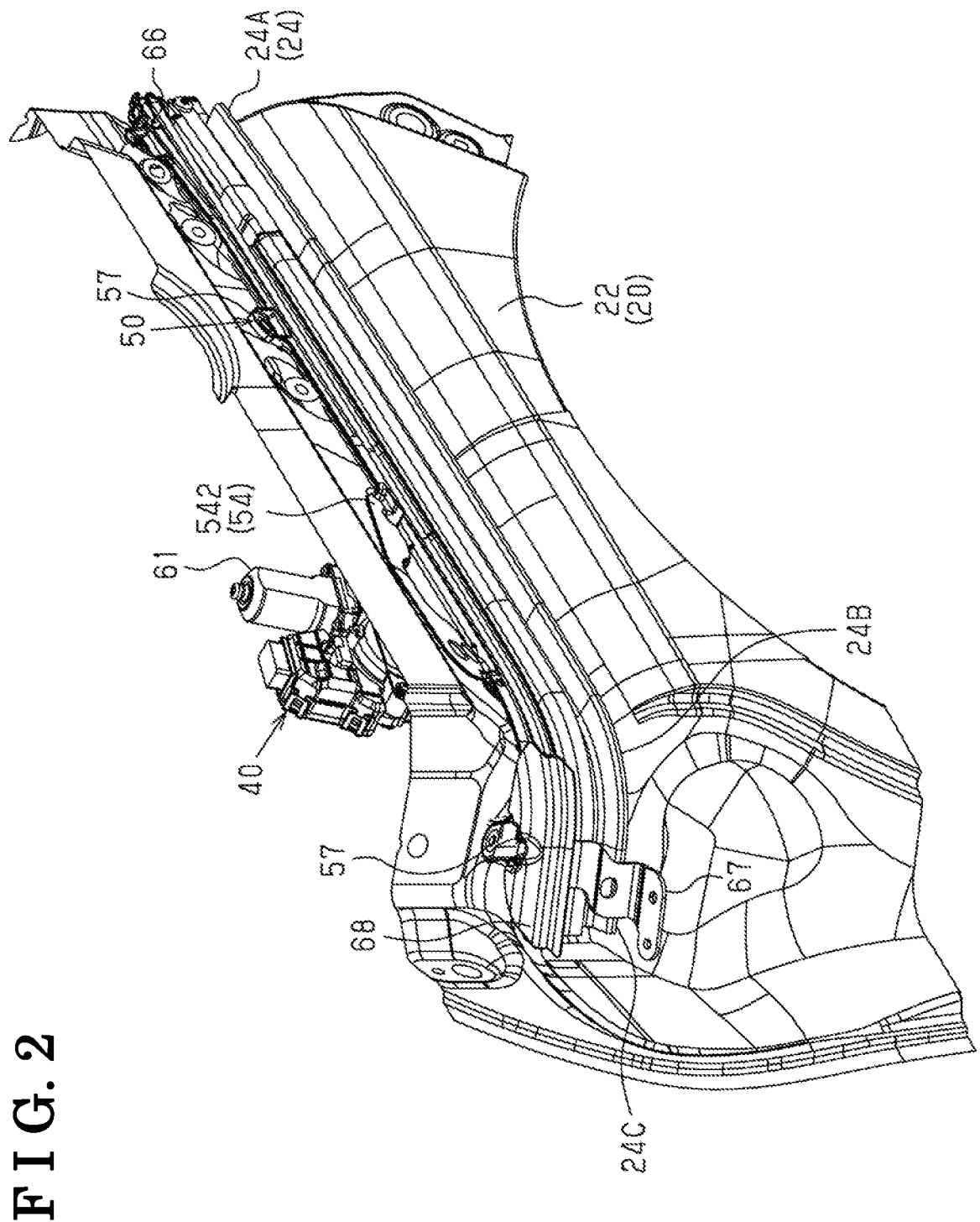
FIG. 2 is an enlarged perspective view of the vehicle.

As illustrated in FIG. 2, the body panel 22 is a side body panel constituting a side of the vehicle body 20. While being hidden by the door drive device 40 in FIG. 2, an insertion hole for passing part of components of the door drive device 40 in the widthwise direction is bored through the body panel 22 in a plate thickness direction. The center rail 24 includes a first rail 24A extending forward, a second rail 24B extending inward in the vehicle widthwise direction in an arc shape from the front end of the first rail 24A toward the front, and a third rail 24C extending linearly from the front end of the second rail 24B. While illustration is omitted, each of the upper rail 23 and the lower rail 25 also includes structures associated to the first rail 24A, the second rail 24B, and the third rail 24C. Accordingly, each of the upper rail 23, the center rail 24, and the lower rail 25 is curved in such a way that the front end is positioned inward relative to the rear end in the widthwise direction. The upper rail 23, the center rail 24, and the lower rail 25 being curved allows the sliding door 30 to move in the widthwise direction near a fully closed position. Note that the radius of curvature of the curved part of the center rail 24 is smaller compared with those of the upper rail 23 and the lower rail 25. The reason is that when the radius of curvature of the curved part of the center rail 24 is increased, the length of the door opening 21 in the lengthwise direction decreases due to the front end of the center rail 24 extending further forward.

Sliding Door 30

As illustrated in FIG. 1, the sliding door 30 includes a door body 31 sized according to the door opening 21, an upper hinge unit 32 placed in an upper part of the door body 31, a center hinge unit 33 placed in a rear part of the door body 31, and a lower hinge unit 34 placed in a lower part of the door body 31.

The upper hinge unit 32 and the lower hinge unit 34 are positioned near the front end of the door body 31, and the center hinge unit 33 is positioned near the rear end of the door body 31. The center hinge unit 33 is positioned in a central part of the door body 31 in the vertical direction. The upper hinge unit 32 is engaged with the upper rail 23 in such a way as to be movable along the upper rail 23. The center hinge unit 33 is engaged with the center rail 24 in such a way as to be movable along the center rail 24. The lower hinge unit 34 is engaged with the lower rail 25 in such a way as to be movable along the lower rail 25.

Then, by the upper hinge unit 32, the center hinge unit 33, and the lower hinge unit 34 moving relative to the upper rail 23, the center rail 24, and the lower rail 25, respectively, the sliding door 30 opens and closes between a fully closed position where the door opening 21 is fully closed and a fully opened position where the door opening 21 is fully opened. The sliding door 30 opens by moving backward and closes by moving forward, according to the present embodiment. In other words, an opening direction of the sliding door 30 is backward, and a closing direction of the sliding door 30 is forward. The sliding door 30 may open by moving forward and close by moving backward in another embodiment.

Door Drive Device 40

Figure 3:
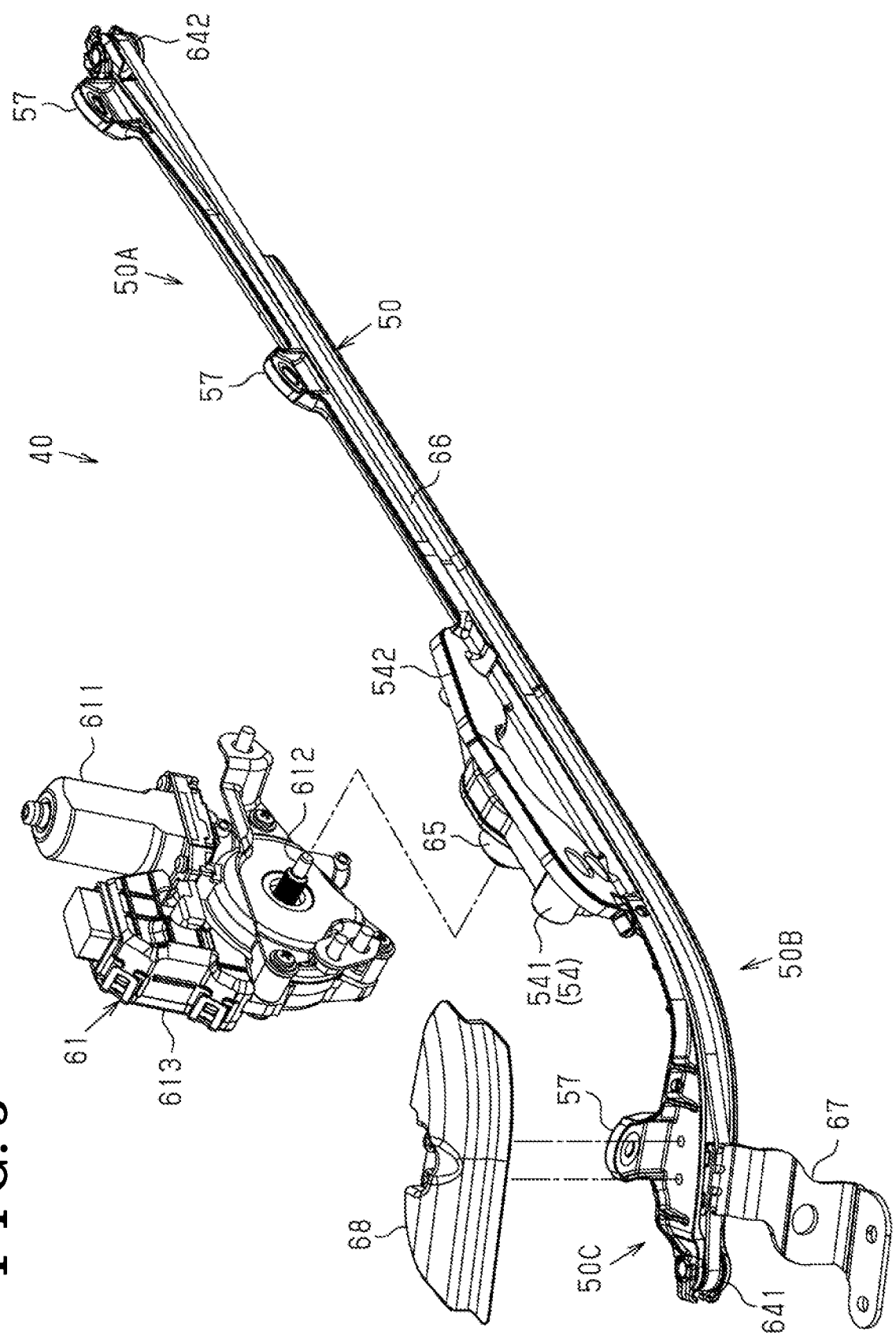
FIG. 3 is an exploded perspective view of the sliding door drive device.
Figure 4:
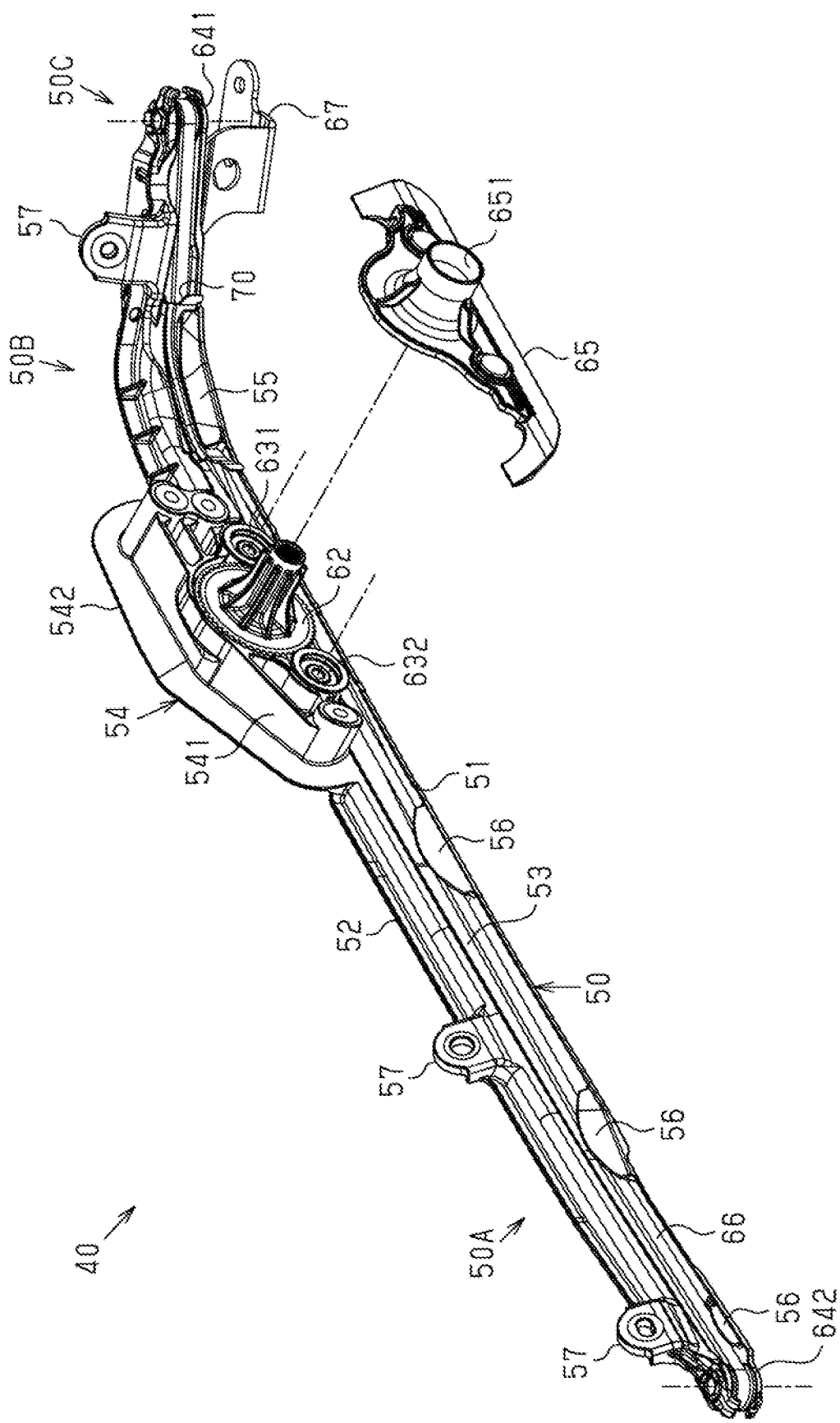
FIG. 4 is an exploded perspective view of the sliding door drive device.
Figure 5:
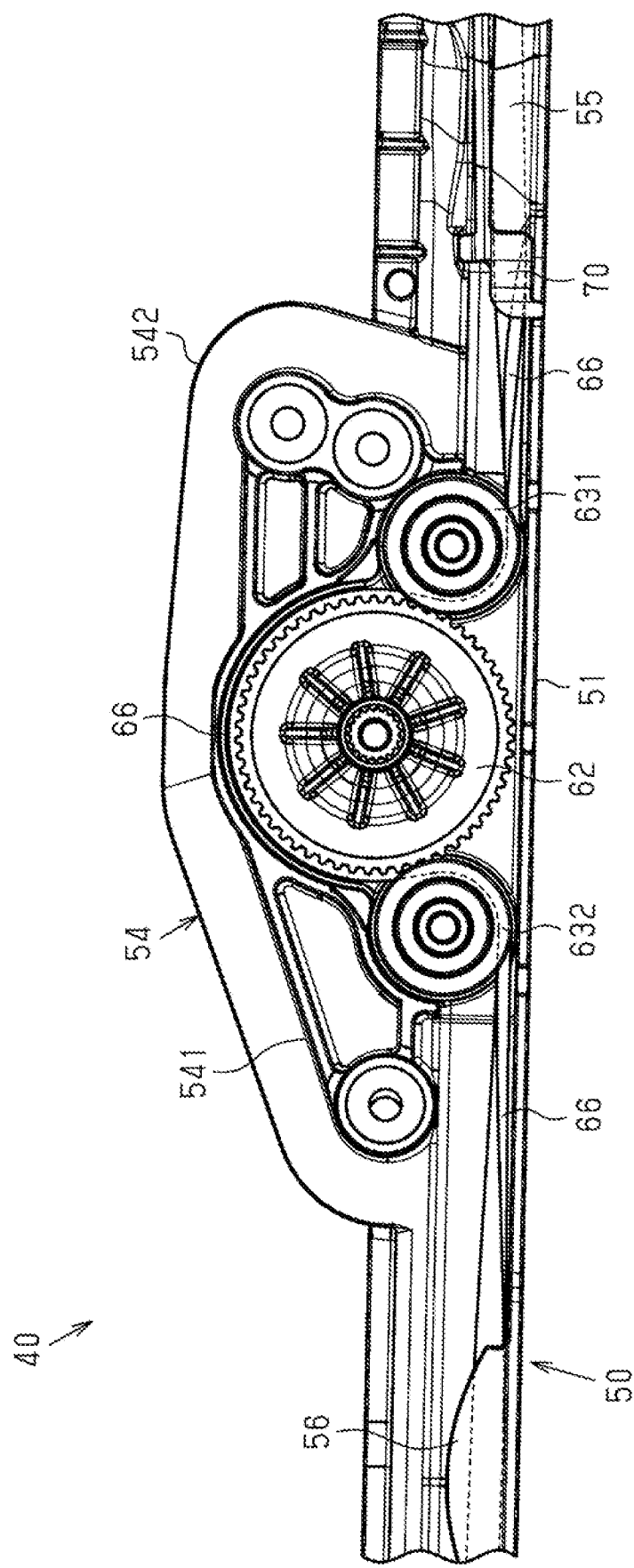
FIG. 5 is a side view of the sliding door drive device partially omitting a structure thereof.

As illustrated in FIG. 3 to FIG. 5, the door drive device 40 includes a guide frame 50, a belt drive part 61, a drive pulley 62, two pressing pulleys 631 and 632, two driven pulleys 641 and 642, a cover 65, a belt 66, a connector 67, a protection plate 68, and a sliding plate 70.

The door drive device 40 is fixed to the body panel 22 along the center rail 24 at a position vertically aligned with the center rail 24. Then, the door drive device 40 moves the sliding door 30 in the opening direction and the closing direction. In the following description, fixing the door drive device 40 to the body panel 22 is also referred to as "mounting the door drive device 40 on the vehicle body 20."

As illustrated in FIG. 3 and FIG. 4, the guide frame 50 has a long form, similarly to the center rail 24. Specifically, when mounted on the vehicle body 20, the guide frame 50 in curved in such a way that the front end is positioned inward relative to the rear end in the widthwise direction.

In the following description, a part extending forward in the guide frame 50 is referred to as a "first linear part 50A," a part extending inward in the widthwise direction in an arc shape from the front end of the first linear part 50A toward the front is referred to as a curved part 50B, "and a part extending linearly from the front end of the curved part 50B is referred to as a second linear part 50C," as illustrated in FIG. 3 and FIG. 4. The first linear part 50A is longer than the curved part 50B and the second linear part 50C, and the curved part 50B and the second linear part 50C have an equal length. In terms of a relation with the opening-closing direction of the sliding door 30, the front end of the guide frame 50 is an end in the closing direction, and the rear end of the guide frame 50 is an end in the opening direction.

Figure 6:
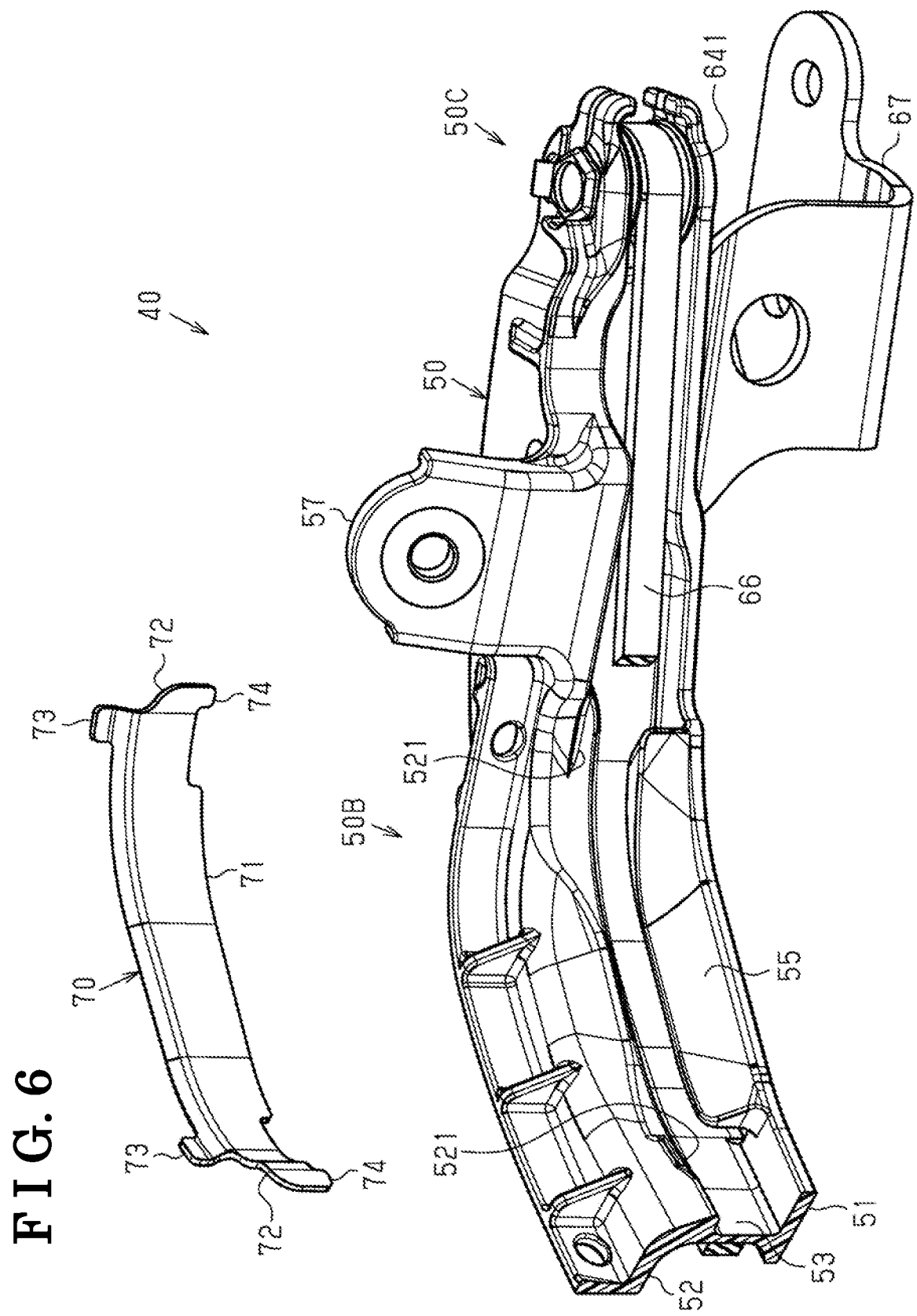
FIG. 6 is an exploded perspective view of the front end of the sliding door drive device.

As illustrated in FIG. 4 and FIG. 6, the guide frame 50 includes a bottom wall 51, an upper wall 52, a guide wall 53, a housing part 54, a support wall 55, a retention wall 56, and a fixing part 57. For example, the guide frame 50 is made of a resin material and is formed by using a metal mold.

As illustrated in FIG. 4, the bottom wall 51, the upper wall 52, and the guide wall 53 are long curved members, similarly to the center rail 24. The bottom wall 51 connects to the lower end of the guide wall 53, and the upper wall 52 connects to the upper end of the guide wall 53. In other words, the bottom wall 51 and the upper wall 52 sandwich the guide wall 53. The length of each of the bottom wall 51 and the upper wall 52 in a longitudinal direction is slightly longer than the length of the guide wall 53 in the longitudinal direction. As illustrated in FIG. 6, the upper wall 52 includes two contact parts 521 protruding along a radial direction of the curved part 50B in the curved part 50B. The two contact parts 521 are positioned with a space in between in the longitudinal direction of the guide frame 50.

In the following description, a surface of the guide wall 53 facing inward in the widthwise direction is referred to as an "inner side," and a surface of the guide wall 53 facing outward in the widthwise direction is referred to as an "outer side." The inner side is a surface facing the body panel 22 when the door drive device 40 is mounted on the vehicle body 20.

As illustrated in FIG. 4, the housing part 54 is integrated with the upper wall 52 and the guide wall 53 at a position closer to the front end than the central part of the guide frame 50 in the longitudinal direction. The housing part 54 includes an enclosure 541 housing the drive pulley 62 and the two pressing pulleys 631 and 632, and a flange 542 extending from an edge of the enclosure 541. When the door drive device 40 is mounted on the vehicle body 20, the enclosure 541 is positioned inside the body panel 22 through the insertion hole, and the flange 542 is positioned outside the body panel 22.

As illustrated in FIG. 6, the support wall 55 extends upward from the curved part 50B of the bottom wall 51. In other words, the support wall 55 faces the inner side of the curved part 50B of the guide wall 53. Denoting a direction in which the support wall 55 extends by a height direction, the support wall 55 is slightly curved in a plan view in the height direction. A surface of the support wall 55 facing the guide wall 53 extends in the vertical direction. On the other hand, a surface of the support wall 55 facing the body panel 22 when the door drive device 40 is mounted on the vehicle body 20 is tilted relative to the vertical direction. In other words, the surface of the support wall 55 facing the body panel 22 extends along the outer surface of the body panel 22.

As illustrated in FIG. 4, the retention wall 56 extends upward from the first linear part 50A of the bottom wall 51. In other words, the retention wall 56 faces the first linear part 50A of the guide wall 53. The retention wall 56 is positioned between the rear end of the guide frame 50 and the housing part 54 in the longitudinal direction of the guide frame 50. A surface of the retention wall 56 facing the guide wall 53 extends in the vertical direction. On the other hand, a surface of the retention wall 56 facing the body panel 22 when the door drive device 40 is mounted on the vehicle body 20 is tilted relative to an upward direction. In other words, the surface of the retention wall 56 facing the body panel 22 extends along the outer surface of the body panel 22. While the guide frame 50 according to the present embodiment includes three retention walls 56, the number of retention walls 56 may be arbitrarily changed. Then, the retention wall 56 guides movement of the belt 66 with the first linear part 50A of the guide frame 50.

The fixing part 57 extends upward from the upper wall 52. A plurality of fixing parts 57 are provided with a space in between in the longitudinal direction of the guide frame 50. The fixing part 57 is a part through which fastening members such as a screw and a bolt pass when the door drive device 40 is mounted on the vehicle body 20, in other words, when the guide frame 50 is fixed to the body panel 22.

As illustrated in FIG. 3, the belt drive part 61 includes a motor 611, an output shaft 612 to which motive power of the motor 611 is output, and a case 613 housing components of the belt drive part 61. The belt drive part 61 includes, in the case 613, an unillustrated speed reducer transferring motive power of the motor 611 to the output shaft 612. An axial direction of the output shaft 612 is the widthwise direction. The output shaft 612 is connected to the drive pulley 62. As illustrated in FIG. 2, when the door drive device 40 is mounted on the vehicle 10, the belt drive part 61 is placed inside the body panel 22. In this respect, the belt drive part 61 may be considered to sandwich the body panel 22 with the guide frame 50.

As illustrated in FIG. 4, the drive pulley 62, the first pressing pulley 631, and the second pressing pulley 632 are housed in the housing part 54 of the guide frame 50. Specifically, the drive pulley 62, the first pressing pulley 631, and the second pressing pulley 632 are rotatably supported by the enclosure 541. At this time, the drive pulley 62 is positioned between the first pressing pulley 631 and the second pressing pulley 632 in the longitudinal direction of the guide frame 50. Further, when the door drive device 40 is mounted on the vehicle body 20, axes of rotation of the drive pulley 62, the first pressing pulley 631, and the second pressing pulley 632 extend in the widthwise direction. The drive pulley 62 is a toothed pulley.

As illustrated in FIG. 4, the first driven pulley 641 is rotatably supported at the front end of the guide frame 50 in the longitudinal direction. Specifically, the first driven pulley 641 is supported between the front end of the bottom wall 51 in the longitudinal direction and the front end of the upper wall 52 in the longitudinal direction. The second driven pulley 642 is rotatably supported at the rear end of the guide frame 50 in the longitudinal direction. Specifically, the second driven pulley 642 is supported between the rear end of the bottom wall 51 in the longitudinal direction and the rear end of the upper wall 52 in the longitudinal direction. In these respects, the bottom wall 51 and the upper wall 52 may be considered to sandwich the guide wall 53 in an axial direction of the first driven pulley 641 and the second driven pulley 642. Furthermore, the guide wall 53 may be considered to be positioned between the first driven pulley 641 and the second driven pulley 642.

When the door drive device 40 is mounted on the vehicle body 20, axes of rotation of the first driven pulley 641 and the second driven pulley 642 extend in the vertical direction. In other words, the axes of rotation of the first driven pulley 641 and the second driven pulley 642 have a skew positional relation with axes of rotation of the drive pulley 62, the first pressing pulley 631, and the second pressing pulley 632. The first driven pulley 641 and the second driven pulley 642 are idlers.

The cover 65 is a part covering the drive pulley 62, the first pressing pulley 631, and the second pressing pulley 632 that are housed in the housing part 54. The cover 65 includes a through-hole 651 for connecting the output shaft 612 of the belt drive part 61 to the drive pulley 62. The cover 65 is fixed to the housing part 54 of the guide frame 50.

The belt 66 is a toothed belt made of an elastomer such as rubber or resin. The belt 66 is wrapped around the drive pulley 62, the two pressing pulleys 631 and 632, and the two driven pulleys 641 and 642 in a state of surrounding the guide wall 53 of the guide frame 50. As illustrated in FIG. 4, the axes of rotation of the drive pulley 62 and the two pressing pulleys 631 and 632, and the axes of rotation of the two driven pulleys 641 and 642 have a skew positional relation, according to the present embodiment. Therefore, as illustrated in FIG. 5, twists occur in the belt 66 around a part where the belt 66 is wrapped around the drive pulley 62 and the two pressing pulleys 631 and 632. Specifically, a twist occurs between the pressing pulley 631 and the sliding plate 70, and a twist occurs between the pressing pulley 632 and the retention wall 56 in the belt 66.

As illustrated in FIG. 3, the connector 67 is a bracket for fixing the center hinge unit 33 of the sliding door 30 to the belt 66. Specifically, one end of the connector 67 is fixed to the center hinge unit 33, and the other end is fixed to the bracket.

For example, the protection plate 68 is formed by pressing a metal plate, as illustrated in FIG. 3. The protection plate 68 is fixed to the second linear part 50C of the upper wall 52 of the guide frame 50 from above. When the protection plate 68 is fixed to the guide frame 50, the belt 66 is covered by the protection plate 68 in the horizontal direction. Thus, the protection plate 68 suppresses the belt 66 guided along the second linear part 50C of the guide frame 50 coming in contact with a foreign substance.

As illustrated in FIG. 6, the sliding plate 70 includes a body part 71 supported by the support wall 55 of the guide frame 50, two extension parts 72 extending in such a way as to avoid the support wall 55 of the guide frame 50, two engaging parts 73 engaged with the upper wall 52 of the guide frame 50, and a locking part 74 engaged with the bottom wall 51 of the guide frame 50. For example, the sliding plate 70 is formed by pressing a metal plate such as a stainless plate. The sliding plate 70 is an example of a "sliding part."

The body part 71 is rectangular when viewed from a plate thickness direction. The body part 71 is slightly curved in such a way as to form an arc shape in a plan view. Specifically, the body part 71 is curved at a curvature equal to that of the curved part 50B of the guide wall 53 of the guide frame 50 in a plan view. One end of the body part 71 in a transverse direction is slightly crooked across the body part 71 in the longitudinal direction. The two extension parts 72 extend from both ends of the body part 71 in the longitudinal direction, respectively. Each of the two extension parts 72 extends in a direction slightly tilted relative to the longitudinal direction of the body part 71. In a plan view of the sliding plate 70, each of the two extension parts 72 is tilted in a direction with an increased degree of curving relative to the body part 71. The two engaging parts 73 extend in the transverse direction of the body part 71 on both sides of the body part 71 in the longitudinal direction, respectively. The two locking parts 74 extend from the front edges of the two extension parts 72 in the transverse direction of the body part 71, respectively. In terms of a relation with the vehicle 10, the two engaging parts 73 extend upward, and the two locking parts 74 extend downward.

Figure 7:
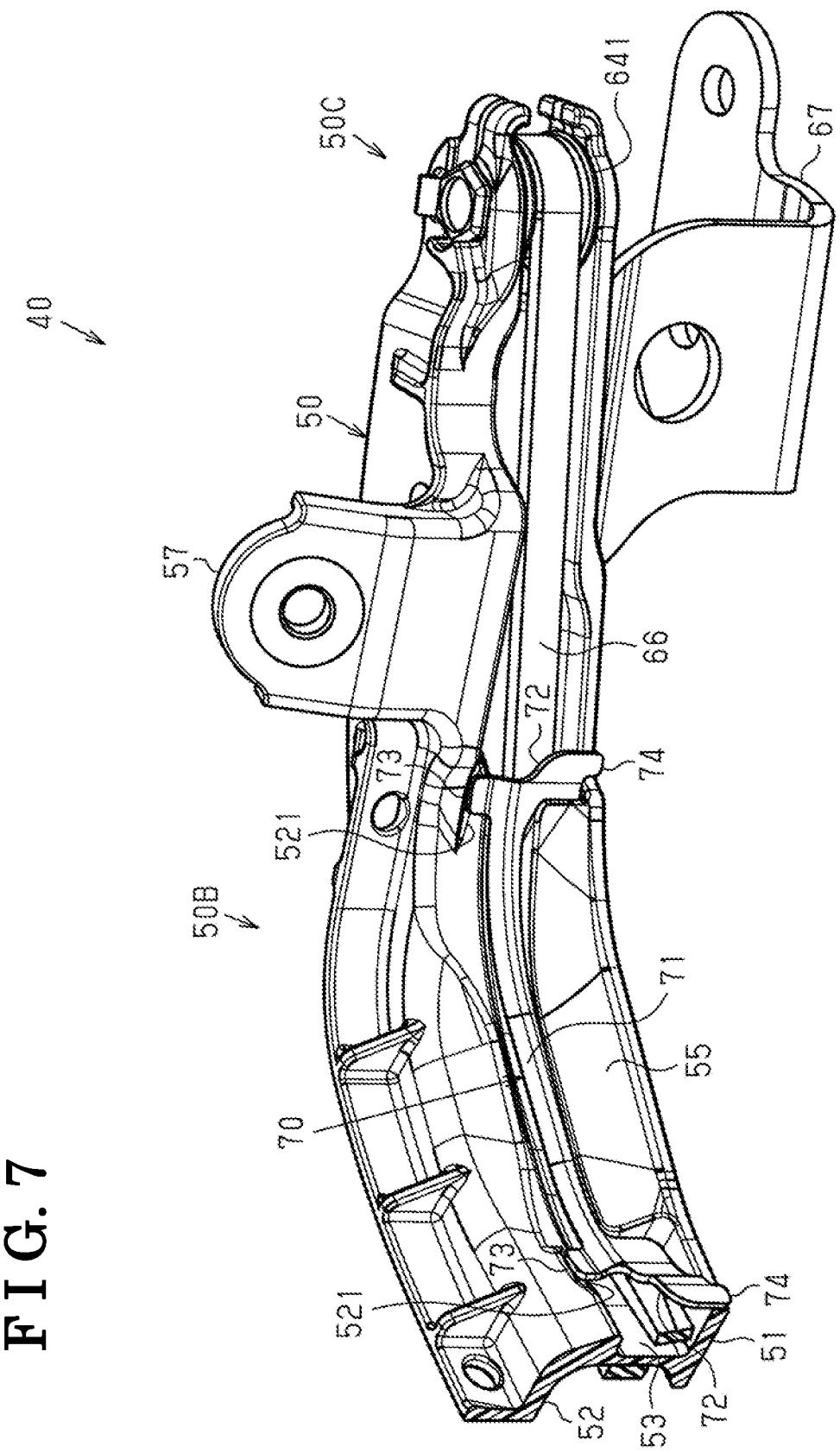
FIG. 7 is a perspective view of the front end of the sliding door drive device.
Figure 8:
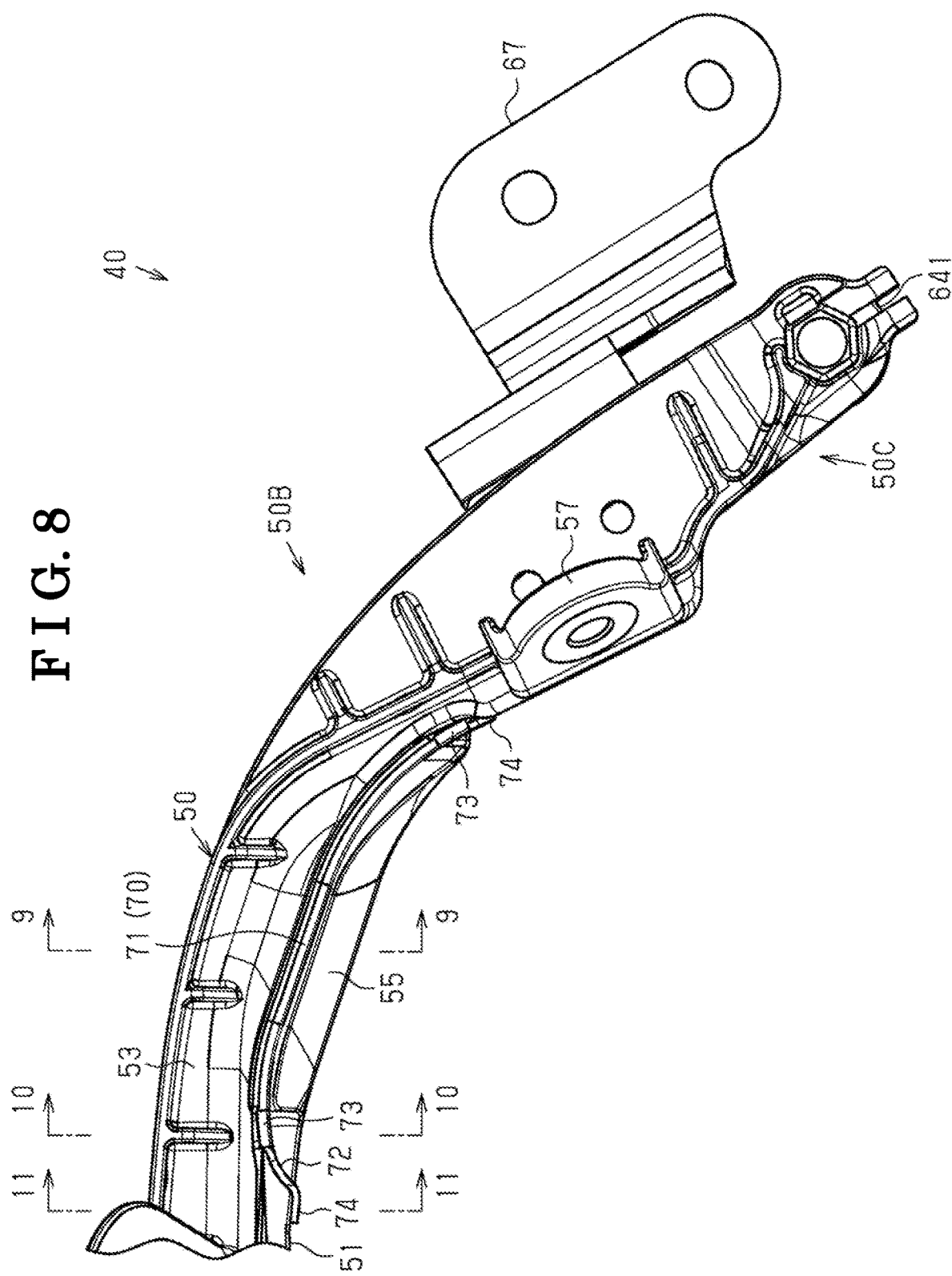
FIG. 8 is a plan view of the front end of the sliding door drive device.

As illustrated in FIG. 7 and FIG. 8, the sliding plate 70 is inserted into the guide frame 50. Specifically, the sliding plate 70 is inserted between the curved part 50B of the guide wall 53 and the support wall 55. At this time, the sliding plate 70 is elastically deformed slightly. Thus, the sliding plate 70 is placed at a position sandwiching the belt 66 with the inner side of the curved part 50B of the guide wall 53. In other words, the sliding plate 70 is supported by the guide frame 50.

Figure 9:
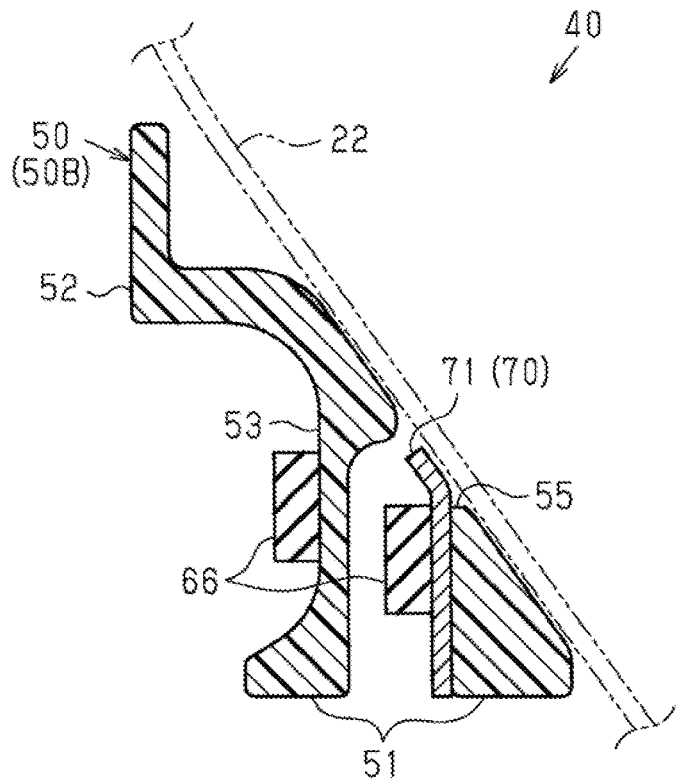
FIG. 9 is a cross-sectional view taken along a line 9-9 in FIG. 8.

In a situation in which the sliding plate 70 is supported by the guide frame 50, the body part 71 of the sliding plate 70 is in surface contact with the support wall 55, as illustrated in FIG. 8 and FIG. 9. In other words, the body part 71 of the sliding plate 70 is positioned between the support wall 55 and the belt 66.

Figure 10:
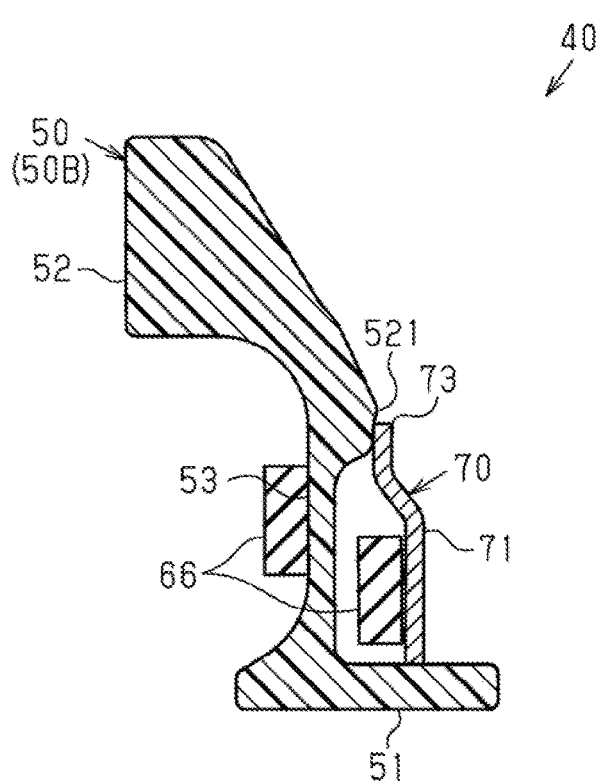
FIG. 10 is a cross-sectional view taken along a line 10-10 in FIG. 8.

As illustrated in FIG. 8 and FIG. 10, the two engaging parts 73 of the sliding plate 70 are engaged with two contact parts 521 of the upper wall 52 of the guide frame 50, respectively. When the sliding plate 70 is inserted into the guide frame 50, the two engaging parts 73 of the sliding plate 70 are elastically deformed slightly. Then, the two engaging parts 73 of the sliding plate 70 are placed below the two contact parts 521 of the upper wall 52 of the guide frame 50, respectively. As a result, the sliding plate 70 is sandwiched between the two engaging parts 73 and the bottom wall 51 in the vertical direction.

Figure 11:
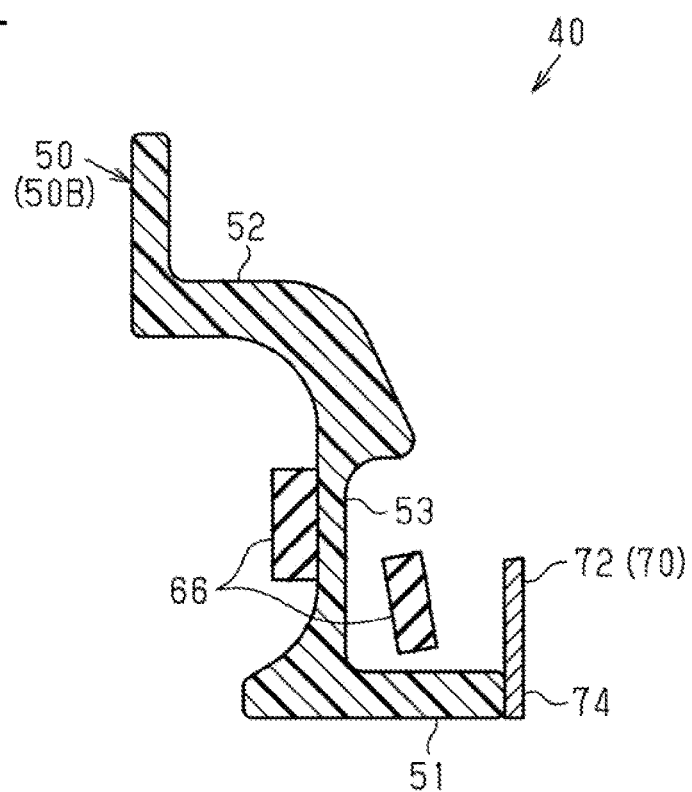
FIG. 11 is a cross-sectional view taken along a line 11-11 in FIG. 8.

As illustrated in FIG. 6 and FIG. 11, the two locking parts 74 of the sliding plate 70 are locked to the bottom wall 51 of the curved part 50B. At this time, while the support wall 55 of the guide frame 50 is positioned closer to the body panel 22 than the body part 71 of the sliding plate 70, the two locking parts 74 of the sliding plate 70 are positioned closer to the body panel 22 than the bottom wall 51 of the guide frame 50. At this time, the sliding plate 70 sandwiches the guide frame 50 by restoring force.

Thus, the sliding plate 70 is firmly supported on the guide frame 50 without using a fastening member such as a screw. As a result, the sliding plate 70 can press the belt 66 down toward the curved part 50B of the guide wall 53.

Operation of the present embodiment will be described.

As illustrated in FIG. 3, when the sliding door 30 is opened, the belt 66 is driven in such a way that the connector 67 moves backward. On the other hand, when the sliding door 30 is closed, the belt 66 is driven in such a way that the connector 67 moves forward. In a situation in which the belt 66 is driven, the belt 66 slides on the sliding plate 70, as illustrated in FIG. 7. In other words, the belt 66 moves in one direction and in the other direction between the inner side of the guide wall 53 and the sliding plate 70, in the curved part 50B of the guide frame 50. Thus, the sliding plate 70 suppresses the belt 66 interfering with the body panel 22.

Effects of the present embodiment will be described.

(1) The door drive device 40 includes the sliding plate 70 sliding on the driven belt 66 instead of a pulley rotating according to the driven belt 66, as a structure preventing interference between the belt 66 and the body panel 22. Therefore, the door drive device 40 enables reduction in bulging against the body panel 22 since a structure rotatably supporting a pulley is unnecessary.

(2) The sliding plate 70 is plate shaped. Therefore, the structure of the door drive device 40 can be simplified compared with, for example, a case of using a plurality of pins as the "sliding part."

(3) As illustrated in FIG. 9, the sliding plate 70 is positioned between the curved part 50B of the guide wall 53 and the support wall 55 and specifically between the belt 66 and the support wall 55, in the door drive device 40. In other words, on the basis of the sliding plate 70, the support wall 55 is positioned in a direction in which reaction force from the belt 66 acts. Therefore, the sliding plate 70 is resistant to displacement toward the body panel 22 even when the reaction force from the belt 66 acts. Accordingly, the door drive device 40 enables stabilization of the posture of the sliding plate 70 relative to the guide frame 50.

(4) As illustrated in FIG. 9, the support wall 55 of the guide frame 50 has a shape running along the outer surface of the body panel 22. Therefore, the support wall 55 of the guide frame 50 can be in surface contact with the outer surface of the body panel 22. Accordingly, reaction force from the belt 66 acting on the sliding plate 70 can be received not only by the support wall 55 but also by the body panel 22. Accordingly, the door drive device 40 enables suppression of load concentration on the support wall 55.

(5) As illustrated in FIG. 7 and FIG. 10, the two engaging parts 73 of the sliding plate 70 are engaged with the contact parts 521 of the upper wall 52 of the guide frame 50. Specifically, two engaging parts 73 of the sliding plate 70 are engaged with the contact part 521 of the upper wall 52 of the guide frame 50 from below. Therefore, movement of the sliding plate 70 in the vertical direction is restricted by the bottom wall 51 and the upper wall 52 of the guide frame 50. Accordingly, the door drive device 40 enables stabilization of the posture of the sliding plate 70.

(6) As illustrated in FIG. 7 and FIG. 11, the two locking parts 74 of the sliding plate 70 are locked to the bottom wall 51 of the guide frame 50. Therefore, the door drive device 40 enables stabilization of the posture of the sliding plate 70 in the plate thickness direction.

The present embodiment may be modified and implemented as follows. The present embodiment and the following modified examples may be implemented in combination without technically contradicting one another.

Figure 12:
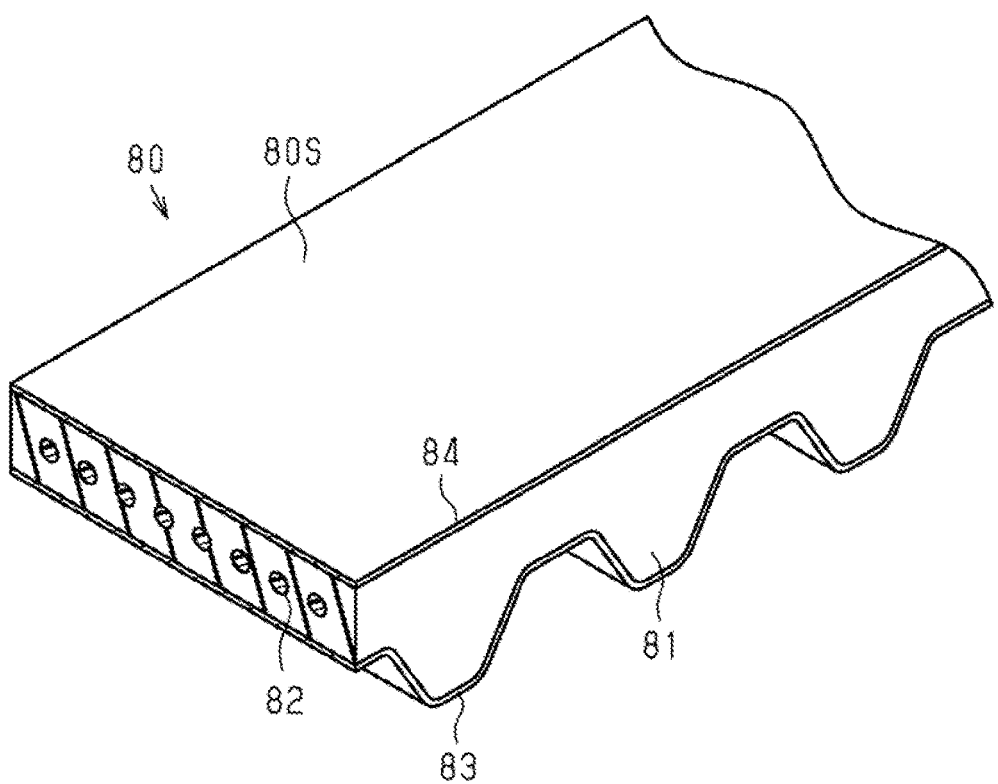
FIG. 12 is a perspective view of a belt according to a modified example.

The belt 66 may be changed to a belt 80 illustrated in FIG. 12. The belt 80 is a toothed belt, similarly to the aforementioned embodiment. As illustrated in FIG. 12, the belt 80 includes a belt body 81, a plurality of core wires 82, a first covering layer 83, and a second covering layer 84. Each of the belt body 81, the core wire 82, the first covering layer 83, and the second covering layer 84 is annular.

The belt body 81 is made of an elastomer such as rubber or resin. The belt body 81 is preferably made of a material with high durability and high abrasion resistance. A material of an elastomer constituting a part on the tooth side of the belt body 81 and a material of an elastomer constituting a part on the back side may be different. The core wire 82 is a reinforcing member of the belt body 81. The core wire 82 is preferably made of a material with high strength against tension, such as resin fiber and metal. The core wires 82 are embedded in the belt body 81 in a state of being aligned in a widthwise direction of the belt 80.

The first covering layer 83 covers the tooth side surface of the belt body 81, and the second covering layer 84 covers the back side surface of the belt body 81. The first covering layer 83 is a so-called tooth cloth. The second covering layer 84 corresponds to an example of a "covering layer" including a sliding surface 80S sliding on the sliding plate 70 and the like. The first covering layer 83 and the second covering layer 84 are cloth-formed members made of synthetic fiber such as nylon. A coefficient of friction between the second covering layer 84 and the sliding plate 70 is lower than a coefficient of friction between the belt body 81 and the sliding plate 70. In other words, a coefficient of friction between the material of the first covering layer 83 and the second covering layer 84, and the metal constituting the sliding plate 70 is lower than a coefficient of friction between the elastomer constituting the belt body 81 and the metal constituting the sliding plate 70. The first covering layer 83 and the second covering layer 84 are preferably made of a material with self-lubricity. A coefficient of friction in the present embodiment refers to a coefficient of kinetic friction.

For example, when the belt 80 is manufactured through a vulcanization process, it is preferable to bring components of the belt 80 into intimate contact with each other in the vulcanization process. Therefore, the core wire 82, the first covering layer 83, and the second covering layer 84 preferably undergo a pretreatment for improving adhesion with the elastomer constituting the belt body 81 before the vulcanization process.

When the sliding door 30 is opened and closed, sliding resistance is generated between the sliding surface 80S of the belt 80 and the sliding plate 70, or sliding resistance is generated between the sliding surface 80S of the belt 80 and the retention wall 56. In the aforementioned modified example, what slides on the sliding plate 70 in the belt 80 is the second covering layer 84 having a relatively low coefficient of friction with metal. Accordingly, the aforementioned modified example can reduce sliding resistance generated, for example, between the driven belt 80 and the sliding plate 70.

When the twisted belt 80 slides on the sliding plate 70 or the like, only part of the belt 80 easily slides on the sliding plate 70 compared with a case of the untwisted belt 80 sliding on the sliding plate 70 or the like. Therefore, when the twisted belt 80 slides on the sliding plate 70 or the like, the belt 80 may be partially abraded. In this respect, the belt 80 includes the second covering layer 84 having a relatively low coefficient of friction with metal. Therefore, the belt 80 is resistant to partial abrasion even when the twisted belt 80 slides on the sliding plate 70 or the like.

As described in the aforementioned embodiment, the radius of curvature of the curved part of the center rail 24 is smaller compared with those of the upper rail 23 and the lower rail 25. Therefore, the radius of curvature of the curved part 50B of the guide frame 50 of the door drive device 40 also decreases. As a result, sliding resistance between the driven belt 80 and the sliding plate 70 also tends to increase. Accordingly, an effect of suppressing sliding resistance by providing the second covering layer 84 in the belt 80 may be considered to be enhanced, according to the aforementioned modified example.

The door drive device 40 may include a pulley rotating according to the driven belt 66 in place of the sliding plate 70, as a structure preventing interference between the belt 66 and the body panel 22. In this case, when the belt 66 is replaced with the belt 80 according to a modified example, sliding resistance generated, for example, between the driven belt 80 and the aforementioned pulley can be reduced.

The guide frame 50 may not include the support wall 55. In this case, the sliding plate 70 is preferably fixed to the bottom wall 51 or the upper wall 52 of the guide frame 50.

The sliding plate 70 may be replaced with a pin or the like slidable on the belt 66. In this case, the pin corresponds to an example of the "sliding part."

The support wall 55 of the guide frame 50 may function as the "sliding part." In this case, a material of the support wall 55 is preferably selected in such a way that the support wall 55 is not abraded due to sliding on the belt 66.

The sliding plate 70 may be integrated with the support wall 55 of the guide frame 50 when the guide frame 50 is resin formed. Thus, the sliding plate 70 can be more firmly fixed to the guide frame 50.

For example, the sliding plate 70 may be fixed to the guide frame 50 by using fastening members such as a screw and a bolt or may be glued to the guide frame 50 by using an adhesive.

The shape of the sliding plate 70 may be appropriately changed. For example, the sliding plate 70 may not include a structure associated to the engaging part 73 or may not include a structure associated to the locking part 74.

The sliding plate 70 may be fixed to the guide frame 50 by providing a hole in the bottom wall 51 of the guide frame 50 and inserting the sliding plate 70 into the hole.

The door drive device 40 may be installed on the body panel 22 along the upper rail 23 or may be installed on the body panel 22 along the lower rail 25.

A sliding door drive device that solves the aforementioned problem is a sliding door drive device being fixed to a body panel of a vehicle and moving a sliding door of the vehicle in an opening direction and a closing direction. The sliding door drive device includes a long guide frame, a first driven pulley, a second driven pulley, a belt, a belt drive part, and a sliding part. The guide frame is curved in such a way that an end of the guide frame in the closing direction is positioned more inward in a vehicle widthwise direction than an end in the opening direction when the guide frame is fixed to the body panel. The first driven pulley and the second driven pulley are supported at both ends of the guide frame in a longitudinal direction, respectively. The belt is wrapped around the first driven pulley and the second driven pulley. The belt drive part drives the belt. The guide frame includes a guide wall guiding the belt between the first driven pulley and the second driven pulley. Denoting a curved part of the guide wall by a curved part and a surface of the guide wall facing the body panel by an inner side, the sliding part is placed at a position sandwiching the belt with the inner side of the curved part of the guide wall and slides on the driven belt.

The sliding door drive device with the aforementioned structure can open and close the sliding door by transferring motive power to the sliding door through the belt. The sliding door drive device includes the sliding part sliding on the driven belt instead of a pressing pulley rotating relative to the driven belt, as a structure preventing the belt from interfering with the body panel. Therefore, the sliding door drive device enables reduction in bulging against the body panel since a structure rotatably supporting a pulley is unnecessary.

In the aforementioned sliding door drive device, the sliding part may be a plate-shaped sliding plate curved along the curved part.

The structure of the aforementioned sliding door drive device can be simplified compared with a case of, for example, using a plurality of pins as a sliding part.

In the aforementioned sliding door drive device, denoting a direction in which axes of rotation of the first driven pulley and the second driven pulley extend by an axial direction, the guide frame may include a bottom wall and an upper wall sandwiching the guide wall in the axial direction across the guide frame in the longitudinal direction, and a support wall extending from the bottom wall in such a way as to face the inner side of the curved part of the guide wall and supporting the sliding plate in a state of being in contact with the sliding plate.

In the sliding door drive device with the aforementioned structure, the sliding plate is positioned between the curved part of the guide wall and the support wall and particularly between the belt and the support wall. In other words, on the basis of the sliding plate, the support wall is positioned in a direction in which reaction force from the belt acts. Therefore, the sliding plate is resistant to displacement in a direction in which the reaction force acts even when the reaction force from the belt acts. Accordingly, the sliding door drive device enables stabilization of a posture of the sliding plate relative to the guide frame.

In the aforementioned sliding door drive device, denoting a direction in which the support wall extends from the bottom wall by a height direction, the upper wall of the guide frame may include a contact part sandwiching the sliding plate with the bottom wall in the height direction.

The sliding door drive device with the aforementioned structure enables stabilization of a posture of the sliding plate relative to the guide frame in the height direction.

In the aforementioned sliding door drive device, the sliding plate may include a body part supported by the support wall, and a locking part locked to the bottom wall on both sides of the body part in the longitudinal direction.

In the sliding door drive device with the aforementioned structure, the locking part of the sliding plate is locked to the bottom wall of the guide frame. Therefore, the sliding door drive device enables further stabilization of the posture of the sliding plate relative to the guide frame.

In the aforementioned sliding door drive device, denoting a surface of the belt sliding on the sliding part by a sliding surface, the belt may include a belt body made of an elastomer, and a covering layer including the sliding surface and covering the belt body. A coefficient of friction between the covering layer and the sliding part may be lower than a coefficient of friction between the belt body and the sliding part.

Sliding resistance is generated between the belt and the sliding part when the sliding door is opened and closed. In this respect, the coefficient of friction between the covering layer and the sliding part is lower than the coefficient of friction between the belt body and the sliding part in the sliding door drive device with the aforementioned structure. Accordingly, the sliding door drive device enables reduction in sliding resistance generated between the belt and the sliding part compared with a case of not providing the covering layer in the belt.

The aforementioned sliding door drive device may further include a drive pulley being supported by the guide frame and being driven by the belt drive part. An axis of rotation of the drive pulley may have a skew positional relation with axes of rotation of the first driven pulley and the second driven pulley. The belt twisted between the first driven pulley and the second driven pulley may be wrapped around the drive pulley.

When the twisted belt slides on the sliding part or the like, only part of the belt easily slides on the sliding part, compared with a case of the untwisted belt sliding on the sliding part or the like. Therefore, when the twisted belt slides on the sliding part or the like, the belt may be partially abraded. In this respect, the belt includes the covering layer having a relatively low coefficient of friction with the sliding part in the sliding door drive device with the aforementioned structure. Therefore, the belt is resistant to partial abrasion even when the twisted belt slides on the sliding part or the like.

In the aforementioned sliding door drive device, the vehicle may include an upper rail placed above a door opening to be opened and closed by the sliding door, a lower rail placed below the door opening, and a center rail placed at a position advanced from the door opening in the opening direction and between the upper rail and the lower rail in a vertical direction. The upper rail, the lower rail, and the center rail may define an opening-closing direction of the sliding door. The guide frame may be fixed to the body panel in such a way as to run along the center rail.

The aforementioned sliding door drive device enables suppression of bulging against the body panel being a fixing target of the sliding door drive device.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A sliding door drive device being fixed to a body panel of a vehicle and moving a sliding door of the vehicle in an opening direction and a closing direction, the sliding door drive device comprising:
   a guide frame being curved in such a way that an end of the guide frame in the closing direction is positioned more inward in a vehicle widthwise direction than an end in the opening direction when the guide frame is fixed to the body panel;
   a first driven pulley and a second driven pulley being supported at both ends of the guide frame in a longitudinal direction, respectively;
   a belt being wrapped around the first driven pulley and the second driven pulley; and
   a belt drive part driving the belt, wherein
   the guide frame includes a guide wall guiding the belt between the first driven pulley and the second driven pulley, the guide wall including a curved part with an inner side facing the body panel, and
   the sliding door drive device further comprises a sliding part sandwiching the belt with the inner side of the curved part of the guide wall and sliding on the belt.

2. The sliding door drive device according to claim 1, wherein
the sliding part is a plate-shaped sliding plate curved along the curved part.

3. The sliding door drive device according to claim 2, wherein,
axes of rotation of the first driven pulley and the second driven pulley extend in an axial direction,
the guide frame includes:
- a bottom wall and an upper wall sandwiching the guide wall in the axial direction across the guide frame in the longitudinal direction; and
- a support wall extending from the bottom wall to face the inner side of the curved part of the guide wall and supporting the sliding plate in a state of being in contact with the sliding plate.

4. The sliding door drive device according to claim 3, wherein,
the support wall extends from the bottom wall in a height direction,
the upper wall of the guide frame includes a contact part sandwiching the sliding plate with the bottom wall in the height direction.

5. The sliding door drive device according to claim 3, wherein
the sliding plate includes a body part supported by the support wall, and a locking part locked to the bottom wall on both sides of the body part in the longitudinal direction.

6. The sliding door drive device according to claim 1, wherein,
the belt slides on the sliding part on a sliding surface,
the belt includes a belt body made of an elastomer and a covering layer including the sliding surface and covering the belt body, and
a coefficient of friction between the covering layer and the sliding part is lower than a coefficient of friction between the belt body and the sliding part.

7. The sliding door drive device according to claim 6, further comprising
a drive pulley supported by the guide frame and driven by the belt drive part, wherein
an axis of rotation of the drive pulley has a skew positional relation with axes of rotation of the first driven pulley and the second driven pulley, and
the belt twisted between the first driven pulley and the second driven pulley is wrapped around the drive pulley.

8. The sliding door drive device according to claim 1, wherein
the vehicle includes an upper rail placed above a door opening to be opened and closed by the sliding door, a lower rail placed below the door opening, and a center rail placed at a position advanced from the door opening in the opening direction and between the upper rail and the lower rail in a vertical direction,
the upper rail, the lower rail, and the center rail define an opening-closing direction of the sliding door, and
the guide frame is fixed to the body panel in such a way as to run along the center rail.

* * * * *